(12) United States Patent  
Kolli

(10) Patent No.: US 9,124,832 B2  
(45) Date of Patent: Sep. 1, 2015

(54) DYNAMIC, LOCAL EDGE PRESERVING DEFECT PIXEL CORRECTION FOR IMAGE SENSORS

(71) Applicant: AltaSens, Inc., Westlake Village, CA (US)

(72) Inventor: Naveen Kolli, Thousand Oaks, CA (US)

(73) Assignee: AltaSens, Inc., Westlake Village, CA (US)

( * ) Notice: Subject to any disclaimer, the term of this patent is extended or adjusted under 35 U.S.C. 154(b) by 0 days.

(21) Appl. No.: 14/512,726

(22) Filed: Oct. 13, 2014

(65) Prior Publication Data

US 2015/0029364 A1 Jan. 29, 2015

Related U.S. Application Data

(63) Continuation of application No. 13/735,301, filed on Jan. 7, 2013, now Pat. No. 8,885,077.

(51) Int. Cl.
*H04N 5/217* (2011.01)
*H04N 5/367* (2011.01)
*H04N 5/357* (2011.01)
*H04N 9/04* (2006.01)

(52) U.S. Cl.
CPC ............. *H04N 5/367* (2013.01); *H04N 5/357* (2013.01); *H04N 5/3675* (2013.01); *H04N 9/045* (2013.01); *H04N 2209/041* (2013.01)

(58) Field of Classification Search
CPC ....................................................... H04N 5/367
USPC ............................................. 348/222.1, 246
See application file for complete search history.

(56) References Cited

U.S. PATENT DOCUMENTS

| | | | |
|---|---|---|---|
| 2002/0196354 A1* | 12/2002 | Chang et al. ................... | 348/246 |
| 2006/0017826 A1* | 1/2006 | Sekimoto et al. ............. | 348/246 |
| 2006/0044409 A1* | 3/2006 | Aoki ........................... | 348/222.1 |
| 2008/0158396 A1* | 7/2008 | Fainstain et al. .............. | 348/246 |
| 2014/0056536 A1* | 2/2014 | Zamyatin et al. ............. | 382/260 |
| 2014/0192236 A1 | 7/2014 | Kolli | |

* cited by examiner

*Primary Examiner* — Joel Fosselman
(74) *Attorney, Agent, or Firm* — Medley, Behrens & Lewis, LLC

(57) ABSTRACT

Various technologies described herein pertain to defect pixel correction for image data collected by a pixel array of an image sensor. Neighborhood statistics for a given pixel from the image data are computed based on values of neighbor pixels of the given pixel from the image data. Whether the value of the given pixel is defective is detected based on the neighborhood statistics. The value of the given pixel is replaced when detected to be defective to output modified image data. Correction of the given pixel is a function of whether the given pixel is in a flat region or a non-flat region. When the given pixel is defective and in a non-flat region, a minimum edge across the given pixel is identified and the value of the given pixel is replaced with an average of values of neighbor pixels that belong to the minimum edge.

20 Claims, 12 Drawing Sheets

| $G_R$ | B | $G_R$ | B | $G_R$ | B |
|---|---|---|---|---|---|
| R | $G_B$ | R | $G_B$ | R | $G_B$ |
| $G_R$ | B | $G_R$ | B | $G_R$ | B |
| R | $G_B$ | R | $G_B$ | R | $G_B$ |
| $G_R$ | B | $G_R$ | B | $G_R$ | B |
| R | $G_B$ | R | $G_B$ | R | $G_B$ |

FIG. 2

DYNAMIC, LOCAL EDGE PRESERVING DEFECT PIXEL CORRECTION FOR IMAGE SENSORS

CROSS-REFERENCE TO RELATED APPLICATION

This application is a continuation of U.S. patent application Ser. No. 13/735,301, filed on Jan. 7, 2013, and entitled "DYNAMIC, LOCAL EDGE PRESERVING DEFECT PIXEL CORRECTION FOR IMAGE SENSORS", the entirety of which is incorporated herein by reference.

BACKGROUND

An image sensor is a device that can convert an optical image into an electronic signal. Image sensors are oftentimes utilized in still cameras, video cameras, video systems, and other imaging devices. Cameras and other imaging devices commonly employ either a charge-coupled device (CCD) image sensor or a complementary metal-oxide-semiconductor (CMOS) image sensor.

CMOS image sensors include an array of pixels, each of which can comprise a photodetector. CMOS image sensors also include circuitry to convert light energy to an analog voltage. Moreover, CMOS image sensors can include additional circuitry to convert the analog voltage to digital data. Thus, a CMOS image sensor can be an integrated circuit that comprises various analog, digital, mixed-signal, etc. components associated with capturing light and processing imaging related information; accordingly, a CMOS image sensor can be a system on chip (SoC). For example, components integrated into the CMOS image sensor oftentimes include a processor module (e.g., microprocessor, microcontroller, or digital signal processor (DSP) core), memory, analog interfaces (e.g., analog to digital converters, digital to analog converters), and so forth.

Visible imaging systems implemented using CMOS image sensors can reduce costs, power consumption, and noise while improving resolution. For instance, cameras can use CMOS image sensors that efficiently marry low-noise image detection and signal processing with multiple supporting blocks that can provide timing control, clock drivers, reference voltages, analog to digital conversion, digital to analog conversion, key signal processing elements, and the like. High-performance video cameras can thereby be assembled using a single CMOS integrated circuit supported by few components including a lens and a battery, for instance. Accordingly, by leveraging CMOS image sensors, camera size can be decreased and battery life can be increased. Also, dual-use cameras have emerged that can employ CMOS image sensors to alternately produce high-resolution still images or high definition (HD) video.

Image sensors oftentimes have defect pixels, which can appear as undesirable outliers when a final image is formed. Defect pixels can have a variety of root causes such as high dark current, faulty transistors, or the like. Moreover, a number of defect pixels may change from image to image as a function of conditions in which a camera is operated such as scene, camera temperature, amount of light, and so forth. For instance, an image obtained by an image sensor may have 1000 defect pixels and a different image obtained by the same image sensor may have 100 defect pixels.

Conventional image processing pipes oftentimes include some type of static pixel correction or dynamic pixel correction. However, performances of conventional approaches vary widely from algorithm to algorithm. For instance, typical static pixel correction approaches are oftentimes inflexible, and thereby unable to mitigate defects that occur intermittently. Moreover, conventional dynamic pixel correction techniques commonly attempt to detect defective pixels as an image is processed, and replace pixels detected to be defective with fair approximations based on a remainder of the image.

SUMMARY

Described herein are various technologies that pertain to defect pixel correction for image data collected by a pixel array of an image sensor. Neighborhood statistics for a given pixel from the image data can be computed based on values of neighbor pixels of the given pixel from the image data. Further, whether the value of the given pixel is defective can be detected based on the neighborhood statistics. Moreover, the value of the given pixel can be replaced when detected to be defective to output modified image data. Correction of the given pixel can be a function of whether the given pixel is in a flat region or a non-flat region. When the given pixel is defective and in a non-flat region, a minimum edge across the given pixel can be identified and the value of the given pixel can be replaced with an average of values of neighbor pixels that belong to the minimum edge.

According to various embodiments, whether the value of the given pixel is defective can be dynamically detected based on the neighborhood statistics. Thus, whether the neighbor pixels cover a flat region or a non-flat region can be detected based upon the neighborhood statistics. Moreover, a predefined parameter can be selected as a function of whether the neighbor pixels cover the flat region or the non-flat region. A high threshold and a low threshold can be computed based upon the selected predefined parameter and the neighborhood statistics. Further, the value of the given pixel from the image data can be detected to be defective when greater than the high threshold or less than the low threshold. Additionally or alternatively, a static defect pixel map can be checked to determine whether the value of the given pixel from the image data is defective (e.g., static detection).

In accordance with various embodiments, when the given pixel from the image data is detected to be defective, the value of the given pixel can be replaced with a central tendency measure of the values of the neighbor pixels when the neighbor pixels are detected to cover a flat region, or replaced with an average of values of the neighbor pixels that belong to a minimum edge when the neighbor pixels are detected to cover a non-flat region. Pursuant to various embodiments, when the given pixel from the image data is detected to be defective and the neighbor pixels are detected to cover a non-flat region, then a subset of the values of the neighbor pixels can be respectively compared to the high threshold and the low threshold. The subset of the values of the neighbor pixels have yet to be processed, while a remainder of the values of the neighbor pixels have been previously processed. Further, the values of the neighbor pixels from the subset respectively determined to be greater than the high threshold or less than the low threshold can be replaced with a predefined temporary value. Magnitudes of a plurality of edges across the given pixel can thereafter be computed subsequent to such replacement. Moreover, a minimum edge having a minimum magnitude from the magnitudes of the plurality of edges can be identified, and the value of the given pixel from the image data can be replaced with the average of the values of the neighbor pixels that belong to the minimum edge.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 illustrates an exemplary portion of a pixel array that includes pixels in differing Bayer domains.

DETAILED DESCRIPTION

Figure 1:
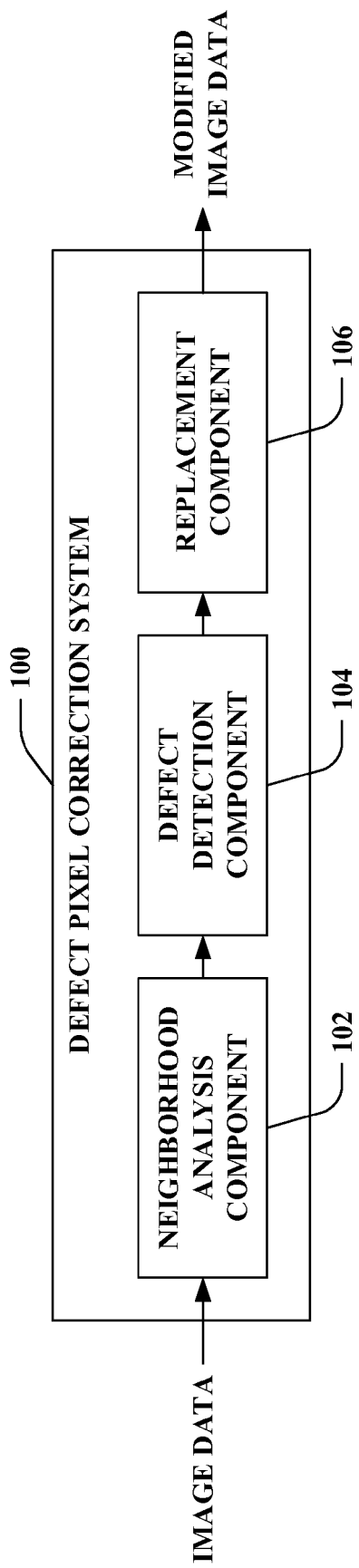
FIG. 1 illustrates an exemplary defect pixel correction system that corrects defect pixels for image data collected by a pixel array of an image sensor.

Various technologies pertaining to dynamically detecting and correcting defective pixels, while preserving local edges, in image data collected by a pixel array of an image sensor are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, defective pixels in image data collected by a pixel array of an image sensor can be dynamically detected and corrected. Defect pixel correction approaches provided herein can maintain image quality and resolution, while correcting defective pixels. Moreover, the defect pixel correction approaches described herein can be dynamic and can preserve local edges.

Referring now to the drawings, FIG. 1 illustrates a defect pixel correction system 100 that corrects defect pixels for image data collected by a pixel array of an image sensor. The defect pixel correction system 100 can receive the image data collected by the pixel array of the image sensor. The image data can pertain to a still image, a frame of a video, etc. Further, the defect pixel correction system 100 can remove outlier pixels from the image data (e.g., from the still image, on a frame by frame basis from the video, etc.).

The image data can include pixels values outputted from the pixel array of the image sensor. Moreover, the defect pixel correction system 100 can process pixels across a row of the pixel array, then pixels across a next row of the pixel array, and so forth. A pixel being processed (e.g., pixel under consideration) by the defect pixel correction system 100 is referred to herein as a given pixel.

Although not shown, it is contemplated that the image data (or a portion thereof) can be retained in a buffer. For example, five line buffers can retain pixel values outputted from five rows of the pixel array of the image sensor. Accordingly, the defect pixel correction system 100 can be compact by employing a limited amount of such hardware resource.

The defect pixel correction system 100 includes a neighborhood analysis component 102 that computes neighborhood statistics for a given pixel from the image data based on values of neighbor pixels of the given pixel from the image data. The neighbor pixels and the given pixel belong to a particular Bayer domain. Moreover, each of the neighbor pixels are vertically, horizontally, or diagonally adjacent to the given pixel within the particular Bayer domain.

The neighborhood statistics computed by the neighborhood analysis component 102 include a standard deviation of the values of the neighbor pixels and a central tendency measure of the values of the neighbor pixels. The central tendency measure of the values of the neighbor pixels can be a mean of the values of the neighbor pixels or a median of the values of the neighbor pixels. According to an example, the neighborhood analysis component 102 can compute the standard deviation of the values of the neighbor pixels, the mean of the values of the neighbor pixels, and the median of the values of the neighbor pixels; yet, it is contemplated that the claimed subject matter is not so limited. Moreover, whether the central tendency measure is the mean of the values of the neighbor pixels or the median of the values of the neighbor pixels can be predefined, altered responsive to an input (e.g., user selection, etc.), or the like.

Moreover, the defect pixel correction system 100 includes a defect detection component 104 that detects whether a value of the given pixel from the image data is defective based upon the neighborhood statistics. The defect detection component 104 can dynamically identify whether the value of the given pixel is defective (e.g., without using predefined knowledge of defective pixels). Additionally or alternatively, the defect detection component 104 can statically identify whether the value of a given pixel is defective. By way of illustration, whether the defect detection component 104 employs dynamic and/or static detection for discerning whether the given pixel is defective can be predefined, altered responsive to an input (e.g., user selection, etc.), and so forth; however, the claimed subject matter is not so limited.

The defect pixel correction system 100 further includes a replacement component 106 that replaces the value of the given pixel from the image data when detected to be defective by the defect detection component 104. Accordingly, modified image data can be outputted by the replacement component 106. The replacement component 106 can replace the value of the given pixel in a similar manner regardless whether the defect detection component 104 detects that the value of the given pixel is defective employing the dynamic approach and/or the static approach set forth herein.

The defect pixel correction system 100 can implement a pixel correction algorithm that maintains resolution and image quality while correcting defective pixels in the Bayer domain. The defect pixel correction system 100 can be effective in both correcting defective pixels and preserving image quality. The defect pixel correction system 100 can preserve image quality by preserving edges in an image (e.g., not blurring edges). More particularly, the defect pixel correction system 100 can perform real time defect pixel correction using information from pixels within the same color (e.g., pixels within the particular Bayer domain). Further, the replacement component 106 can replace the value of the given pixel with a value based upon a minimum edge magnitude in a local region within the pixel array to enhance final image quality. Thus, a scene can be locally interpreted, and the replacement component 106 can replace the value of the given pixel with an appropriate value rather than blurring across edges within the image.

The algorithm implemented by the defect pixel correction system 100 can use few inputs (e.g., user selections, etc.). Moreover, parameters (e.g., chosen responsive to the inputs) used by the defect pixel correction system 100 need not be adjusted online as image content changes; however, it is contemplated that parameters can be adjustable online, if desired.

Turning to FIG. 2, illustrated is a portion 200 of a pixel array that includes pixels in differing Bayer domains. As shown in the portion 200, the pixel array includes four types of pixels that belong to differing Bayer domains. The four types of pixels include red pixels (R), green pixels next to red pixels ($G_R$) (e.g., in the same row as the red pixels), blue pixels (B), and green pixels next to blue pixels ($G_B$) (e.g., in the same row as the blue pixels). The red pixels (R) include photodiodes operative based upon obtaining red light, the green pixels ($G_R$) include photodiodes that operate based upon obtaining green light, the green pixels ($G_B$) include photodiodes operative based upon obtaining green light, and the blue pixels (B) include photodiodes that operate based upon obtaining blue light. The green pixels, $G_B$ and $G_R$, are differentiated from each other based upon the alternating color in the respective row, and such differentiation provides a manner of identifying four separate Bayer domains.

The pixel array can include substantially any number of pixels. The portion 200 of the pixel array illustrated in FIG. 2 shows a pattern of the four types of pixels that belong to the disparate Bayer domains that can be utilized across the pixel array. However, it is to be appreciated that other patterns are intended to fall within the scope of the hereto appended claims.

Figure 3:
FIG. 3 illustrates an exemplary portion of a pixel array that includes a given pixel and a neighborhood of the given pixel.

Now turning to FIG. 3, illustrated is a portion 300 of a pixel array that includes a given pixel and a neighborhood of the given pixel. As shown in FIG. 3, a given pixel $A_{3,3}$ can be evaluated to determine whether it is a defective pixel. Accordingly, a neighborhood for the given pixel $A_{3,3}$ can be formed. Neighbor pixels of the given pixel $A_{3,3}$ and the given pixel $A_{3,3}$ belong to a particular Bayer domain (e.g., belong to the same Bayer domain). Thus, the pixel $A_{3,3}$ and its neighbor pixels are one of red pixels (R), green pixels next to red pixels ($G_R$), blue pixels (B), or green pixels next to blue pixels ($G_B$) (e.g., as shown in FIG. 2).

Each of the neighbor pixels of the given pixel $A_{3,3}$ are either vertically, horizontally, or diagonally adjacent to the given pixel $A_{3,3}$ within the particular Bayer domain. Thus, as shown in FIG. 3, the neighbor pixels of the given pixel $A_{3,3}$ include a pixel $A_{1,1}$, a pixel $A_{1,3}$, a pixel $A_{1,5}$, a pixel $A_{3,1}$, a pixel $A_{3,5}$, a pixel $A_{5,1}$, a pixel $A_{5,3}$, and a pixel $A_{5,5}$. The neighbor pixels are collectively referred to herein as a neighborhood of the given pixel $A_{3,3}$. As illustrated, the pixel $A_{1,3}$ and the pixel $A_{5,3}$ are vertically adjacent to the given pixel $A_{3,3}$ within the Bayer domain (e.g., within the same column of the pixel array). Moreover, the pixel $A_{3,1}$ and the pixel $A_{3,5}$ are horizontally adjacent to the given pixel $A_{3,3}$ within the particular Bayer domain (e.g., within the same row of the pixel array). Further, the pixel $A_{1,1}$, the pixel $A_{1,5}$, the pixel $A_{5,1}$, and the pixel $A_{5,5}$ are diagonally adjacent to the given pixel $A_{3,3}$ within the particular Bayer domain. Moreover, pixels shown in FIG. 3 that are unlabeled belong to other Bayer domains as compared to the Bayer domain of the given pixel $A_{3,3}$; the pixels that belong to the other Bayer domains are not included in the neighborhood of the given pixel $A_{3,3}$.

The pixel $A_{1,1}$, the pixel $A_{1,3}$, the pixel $A_{1,5}$, and the pixel $A_{3,1}$ have previously been processed, replaced if determined to be defective, and are considered to be non-defective pixels when evaluating whether the given pixel $A_{3,3}$ is a defective pixel. One or more of these pixels may be boundary pixels (e.g., a first two columns in an image and a first two rows in an image are boundary pixels, which are considered to be non-defective pixels). These pixels are collectively referred to herein as a pre-neighborhood of the given pixel $A_{3,3}$. Moreover, the pixel $A_{3,5}$, the pixel $A_{5,1}$, the pixel $A_{5,3}$, and the pixel $A_{5,5}$ have yet to be processed, and therefore may or may not be defective. These pixels are collectively referred to herein as a post-neighborhood of the given pixel $A_{3,3}$.

The neighbor pixels are used to determine if the given pixel $A_{3,3}$ is a defective pixel. Thus, upon forming a neighborhood for the given pixel $A_{3,3}$, the neighborhood analysis component 102 of FIG. 1 can compute the neighborhood statistics for the given pixel $A_{3,3}$ from the image data based on the values of the neighbor pixels of the given pixel from the image data, the defect detection component 104 of FIG. 1 can detect whether the value of the given pixel $A_{3,3}$ from the image data is defective, and the replacement component 106 of FIG. 1 can replace the value of the given pixel $A_{3,3}$ from the image data when detected to be defective.

Figure 4:
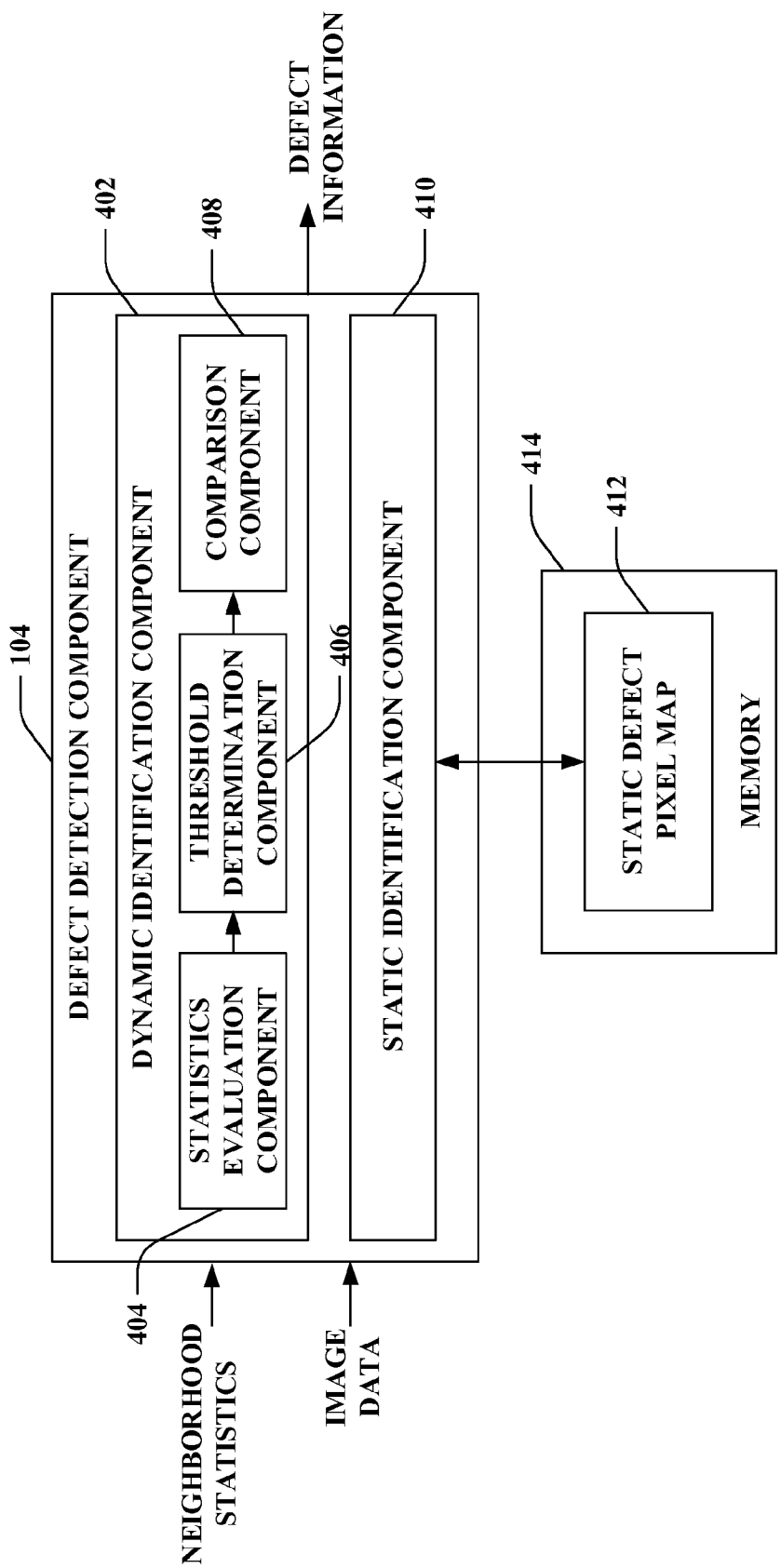
FIG. 4 illustrates a defect detection component included in the exemplary defect pixel correction system of FIG. 1 in greater detail.

With reference to FIG. 4, illustrated is the defect detection component 104 in greater detail. As noted above, the defect detection component 104 can detect whether the value of the given pixel from the image data is defective based upon the neighborhood statistics computed by the neighborhood analysis component 102. The defect detection component 104 includes a dynamic identification component 402 that can dynamically detect defects. The defect detection component 104 can further include a static identification component 410 that can statically detect defects; yet, the claimed subject matter is not so limited.

The dynamic identification component 402 includes a statistics evaluation component 404 that detects whether the neighbor pixels cover a flat region or a non-flat region based upon the neighborhood statistics. The statistics evaluation component 404 can detect that the neighbor pixels cover a flat region when the standard deviation of the values of the neighbor pixels is less than a predefined percentage of the central tendency measure of the values of the neighbor pixels. Further, the statistics evaluation component 404 can detect that the neighbor pixels cover a non-flat region when the standard deviation of the values of the neighbor pixels is greater than or equal to the predefined percentage of the central tendency measure of the values of the neighbor pixels. The predefined percentage can be selected from a range from 0 to 25%. For instance, the predefined percentage can be preset, adjusted responsive to an input (e.g., user selection, etc.), and so forth.

According to an example, the predefined percentage can be selected to be 3%. Thus, if the standard deviation divided by the central tendency measure of the values of the neighbor pixels is less than 3%, then the neighbor pixels can be considered to cover a flat region. Otherwise, if the standard deviation divided by the central tendency measure of the values of the neighbor pixels is greater than or equal to 3%, then the neighbor pixels can be considered to cover a non-flat region. It is to be appreciated, however, that other predefined percentages are intended to fall within the scope of the hereto appended claims, and the claimed subject matter is not limited to the predefined percentage being 3%.

A flat region is an area of an image having similar pixel values with lower variation between the pixel values as compared to a non-flat region. For instance, if an image includes a large white area, the standard deviation of pixel values in the white area may be low because such pixels may be saturated (e.g., the standard deviation may be lower than for an area that includes edges).

Moreover, the dynamic identification component 402 includes a threshold determination component 406 that selects a predefined parameter as a function of whether the neighbor pixels cover the flat region or the non-flat region. Moreover, the threshold determination component 406 computes a high threshold and a low threshold based upon the selected predefined parameter and the neighborhood statistics. The selected predefined parameter includes a first multiplier and a second multiplier when the neighbor pixels cover a flat region. Moreover, the predefined parameter includes a third multiplier and a fourth multiplier when the neighbor pixels cover a non-flat region.

The threshold determination component 406 can compute the high threshold as the central tendency measure plus a product of the standard deviation times the first multiplier when the neighbor pixels cover the flat region. Moreover, the threshold determination component 406 can compute the low threshold as the central tendency measure minus a product of the standard deviation times the second multiplier when the neighbor pixels cover the flat region. Thus, the first multiplier and the second multiplier can be utilized to determine just noticeable difference thresholds (e.g., the high threshold and the low threshold) when the standard deviation is identified as being very low in comparison to the central tendency measure of the neighbor pixels. The first multiplier and the second multiplier can each be selected from a range of 0 to 1. By way of illustration, the first multiplier can be 0.2 and the second multiplier can be 0.4. However, it is contemplated that any other values can be utilized for the first multiplier and/or the second multiplier.

Alternatively, the threshold determination component 406 can compute the high threshold as the central tendency measure plus a product of the standard deviation times the third multiplier when the neighbor pixels cover the non-flat region. Further, the threshold determination component 406 can compute the low threshold as the central tendency measure minus a product of the standard deviation times the fourth multiplier when the neighbor pixels cover the non-flat region. According to another example, the third multiplier and the fourth multiplier can each be selected from a range of 0 to 15. According to an example, the third multiplier can be 5 and the fourth multiplier can be 10. Yet, it is contemplated that substantially any other values of the third multiplier and/or the fourth multiplier can be utilized.

By way of illustration, the first multiplier, the second multiplier, the third multiplier, and/or the fourth multiplier can be predefined, adjusted based upon an input (e.g., user selection, etc.), and so forth. For instance, based on the user selection of the multiplier(s), the low threshold and the high threshold can be calculated by the threshold determination component 406. According to an example, the first multiplier can be less than the second multiplier, and the third multiplier can be less than the fourth multiplier. Thus, the dynamic identification component 402 can be more sensitive to hot pixels as compared to cold pixels. While it is contemplated that different multipliers can be utilized to determine the high threshold and the low threshold, according to other examples it is contemplated that the first multiplier can be equal to the second multiplier and/or the third multiplier can be equal to the fourth multiplier.

The dynamic identification component 402 further includes a comparison component 408 that compares the value of the given pixel to the high threshold and the low threshold computed by the threshold determination component 406. The value of the given pixel from the image data is detected to be defective when greater than the high threshold or less than the low threshold. If the comparison component 408 determines that the given pixel lies outside the low threshold or the high threshold, then the given pixel is deemed defective.

As noted above, the defect detection component 104 can further include the static identification component 410, which can check whether the given pixel is specified as being defective in a static defect pixel map 412. The static defect pixel map 412 can be retained in memory 414. The static identification component 410 checks the static defect pixel map 412 to evaluate whether the given pixel has been identified as defective.

Accordingly, defect information can be outputted by the dynamic identification component 402 and/or the static identification component 410. The defect information, for instance, can specify whether the given pixel is detected to be defective. Hence, regardless whether the given pixel is detected to be defective by the dynamic identification component 402 and/or the static identification component 410, the following logic for replacing the given pixel implemented by the replacement component 106 can be employed.

Figure 5:
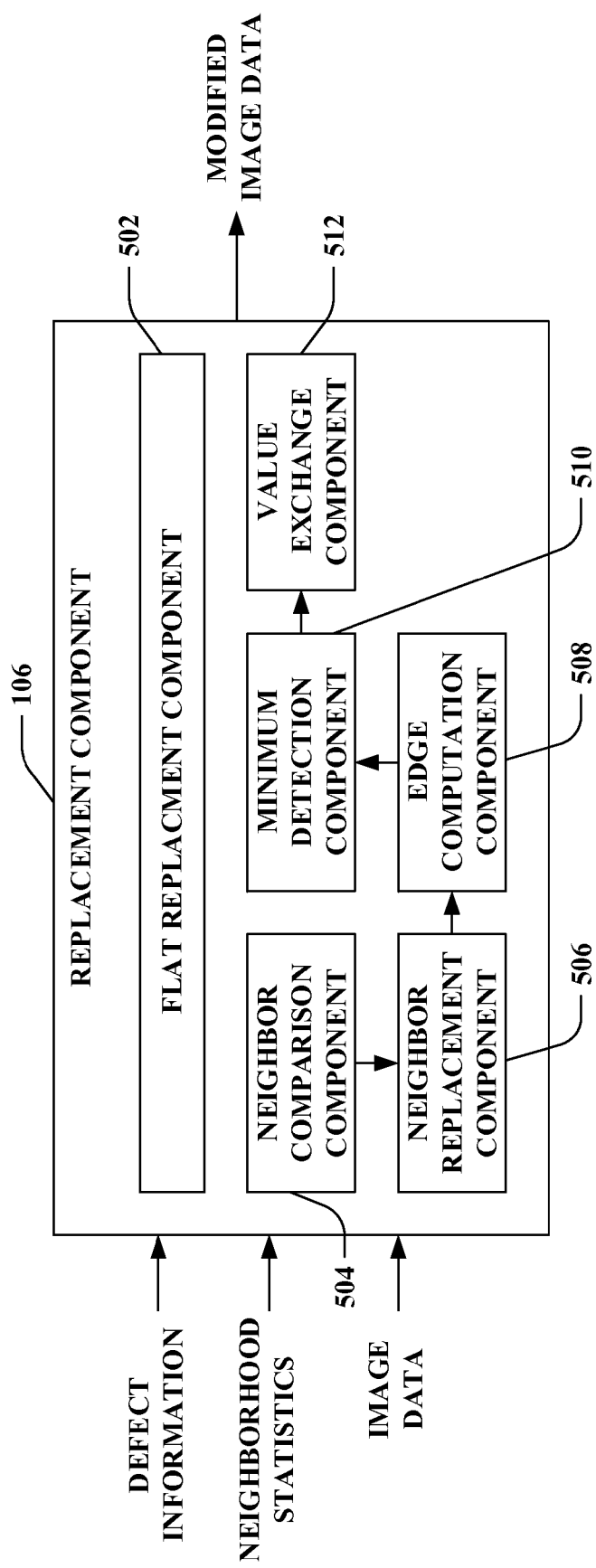
FIG. 5 illustrates a replacement component included in the exemplary defect pixel correction system of FIG. 1 in greater detail.

Turning to FIG. 5, illustrated is the replacement component 106 in greater detail. The replacement component 106 replaces the value of the given pixel from the image data when detected to be defective by the defect detection component 104 (e.g., as specified in the defect information received from the defect detection component 104). The replacement component 106 can output the modified image data.

The replacement component 106 includes a flat replacement component 502 that replaces the value of the given pixel from the image data with the central tendency measure of the values of the neighbor pixels to output the modified image data when the neighbor pixels are detected to cover the flat region. According to an example, when the standard deviation is found to be low as compared to the central tendency measure of the values of the neighbor pixels, then the given pixel is compared to the just noticeable difference high and low thresholds (e.g., based upon the first multiplier and the second multiplier). Following this example, the flat replacement component 502 can replace the value of the given pixel with the central tendency measure of the values of the neighbor pixels (e.g., the median or the mean) when the value of the given pixel is determined to be defective (e.g., greater than the just noticeable difference high threshold or less than the just noticeable difference low threshold).

Moreover, the replacement component 106 can include a neighbor comparison component 504 that respectively compares a subset of the values of the neighbor pixels to the high threshold and the low threshold (e.g., to determine whether one or more of the values of the neighbor pixels from the subset are defective). The subset of the values of the neighbor pixels are for neighbor pixels that have yet to be processed (e.g., the post-neighborhood of the given pixel). Moreover, a remainder of the values of the neighbor pixels not included in the subset are for neighbor pixels that have previously been processed (or are boundary pixels). Thus, the pixels in the post-neighborhood are evaluated against the high threshold and the low threshold by the neighbor comparison component 504, whereas the pixels in the pre-neighborhood need not be evaluated by the neighbor comparison component 504.

The replacement component 106 further includes a neighbor replacement component 506 that replaces, with a predefined temporary value, the values of the neighbor pixels from the subset that are respectively determined to be greater than the high threshold or less than the low threshold by the neighbor comparison component 504. According to an example, the predefined temporary value can be zero; yet, it is contemplated that other predefined temporary values are intended to fall within the scope of the hereto appended claims. Thus, a pixel in the post-neighborhood identified to be defective (e.g., having a value greater than the high threshold or less than the low threshold) has its value replaced with the predefined temporary value by the neighbor replacement component 506 for subsequent calculations. Such replacement of the value(s) of the neighbor pixel(s) in the subset determined by the neighbor comparison component 504 can be effectuated to account for two-pixel clusters. Such replacement may be effective when small values of the third multiplier and the fourth multiplier are employed; yet, the claimed subject matter is not so limited.

The replacement component 106 further includes an edge computation component 508 that computes magnitudes of a plurality of edges across the given pixel subsequent to replacement of the values of the neighbor pixels from the subset that are respectively determined to be greater than the high threshold or less than the low threshold. The edge computation component 508 can compute a particular magnitude of a particular edge across the given pixel as an absolute value of a difference between the values of the neighbor pixels that belong to the particular edge.

Moreover, the replacement component 106 includes a minimum detection component 510 that identifies a minimum edge having a minimum magnitude from the magnitudes of the plurality of the edges. The replacement component 106 further includes a value exchange component 512 that replaces the value of the given pixel from the image data with an average of the values of the neighbor pixels that belong to the minimum edge to output the modified image data.

According to an illustration, when the given pixel from the image data is detected to be defective by the defect detection component 104 and the neighbor pixels are detected to cover the flat region, the flat replacement component 502 can replace the value of the given pixel from the image data with the central tendency measure of the values of the neighbor pixels to output the modified image data. Alternatively, when the given pixel from the image data is detected to be defective by the defect detection component 104 and the neighbor pixels are detected to cover the non-flat region, the neighbor comparison component 504, the neighbor replacement component 506, the edge computation component 508, the minimum detection component 510, and the value exchange component 512 can be employed. More particularly, when the foregoing components are employed, the value of the given pixel from the image data can be replaced by the value exchange component 512 with the average of the values of the neighbor pixels that belong to the minimum edge to output the modified image data.

By way of illustration and referring to the example set forth in FIG. 3, if the pixel $A_{3,3}$ is determined to be defective, then the edge computation component 508 can compute magnitudes of a horizontal edge, a vertical edge, a left diagonal edge, and a right diagonal edge across the given pixel $A_{3,3}$. For example, a horizontal edge magnitude (H_edge), a vertical edge magnitude (V_edge), a left diagonal edge magnitude (LD_edge), and a right diagonal edge (RD_edge) can be calculated by the edge computation component 508 as follows:

$$H\_edge = |A_{3,1} - A_{3,5}|$$

$$V\_edge = |A_{1,3} - A_{5,3}|$$

$$LD\_edge = |A_{1,5} - A_{5,5}|$$

$$RD\_edge = |A_{1,5} - A_{5,1}|$$

If one of the post-neighborhood pixels is determined to be defective by the neighbor comparison component 504 and is replaced by the neighbor replacement component 506 with the predefined temporary value, then the corresponding edge will have an increased magnitude. Moreover, the minimum detection component 510 can identify the minimum of the four magnitudes of the four edges, and pixels belonging to such minimum edge can be averaged by the value exchange component 512 to generate the replacement value for the defective pixel $A_{3,3}$.

Figure 6:
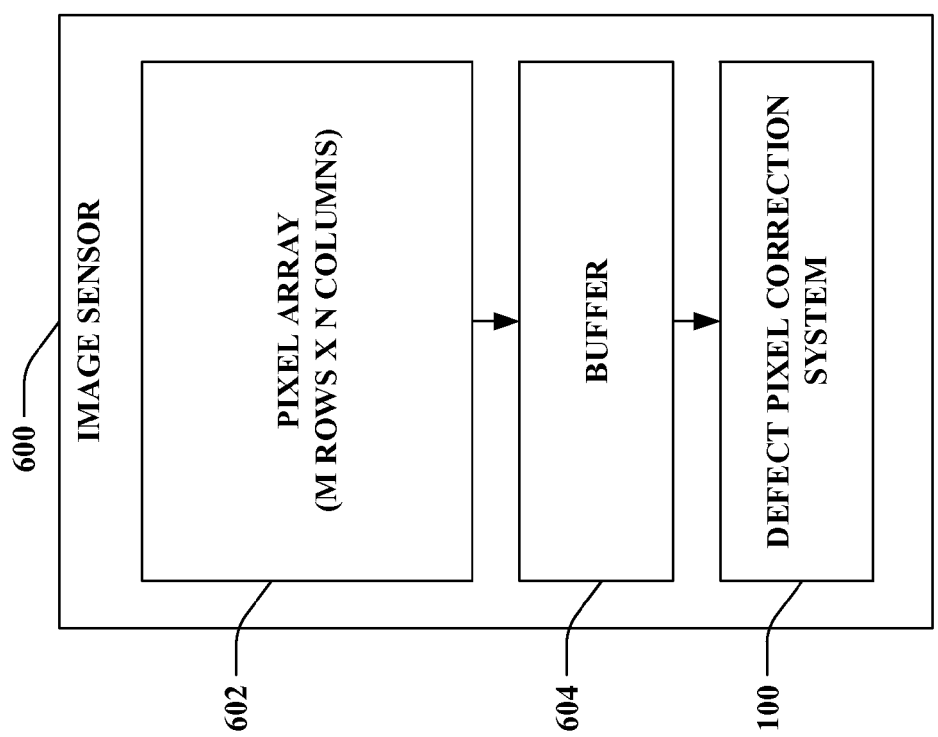
FIG. 6 illustrates an exemplary image sensor.

With reference to FIG. 6, illustrated is an exemplary image sensor 600. The image sensor 600 can be a CMOS image sensor system on chip. The image sensor 600 includes a pixel array 602, a buffer 604, and the defect pixel correction system 100 as described herein. Thus, the defect pixel correction system 100 can be part of the image sensor 600, which can be a Bayer pattern color image sensor. Further, the defect pixel correction system 100 can automatically correct defective pixels of the pixel array 602. According to an example, a digital camera, a video camera (e.g., videoconference camera, broadcast video camera, cinematography camera, surveillance video camera, handheld video camera, camera integrated into a mobile phone, etc.), a video system, a medical imaging device (e.g., video laryngoscope, etc.), an industrial imaging device, a microscope, or the like can include the image sensor 600.

The pixel array 602 can include M rows and N columns of pixels, where M and N can be any integers. Each pixel in the pixel array 602 can comprise a photodetector (e.g., photogate, photoconductor, photodiode, etc.) that overlays a substrate to generate a photo-generated charge. Each pixel can also include a source follower transistor and a floating diffusion region connected to a gate of the source follower transistor. Accordingly, charge generated by the photodetector can be sent to the floating diffusion region. Further, each pixel can include a transistor for transferring charge from the photodetector to the floating diffusion region and another transistor for resetting the floating diffusion region to a predetermined charge level prior to charge transference; yet, it is to be appreciated that the claimed subject matter is not so limited.

Output from a pixel included in a particular column of the pixel array 602 can be provided to a voltage amplifier (not shown) corresponding to the particular column. The voltage amplifier can amplify analog video information (e.g., a signal) read out from the pixel in the particular column as well as other pixels in the particular column. Analog video information yielded from each pixel is oftentimes memorized into a sampling capacitor (not shown) at an output of the voltage amplifier corresponding to the column.

Output from the pixel array 602 can be provided to the buffer 604. The buffer 604 can include five line buffers, for example. Following this example, the buffer 604 can include five lines of memory utilized for correcting a defective pixel. Thus, the buffer 604 can retain image data corresponding to five rows of the pixel array 602. Moreover, the defect pixel correction system 100 can obtain the image data from the buffer 604 and process the pixels as described herein.

Figure 7:
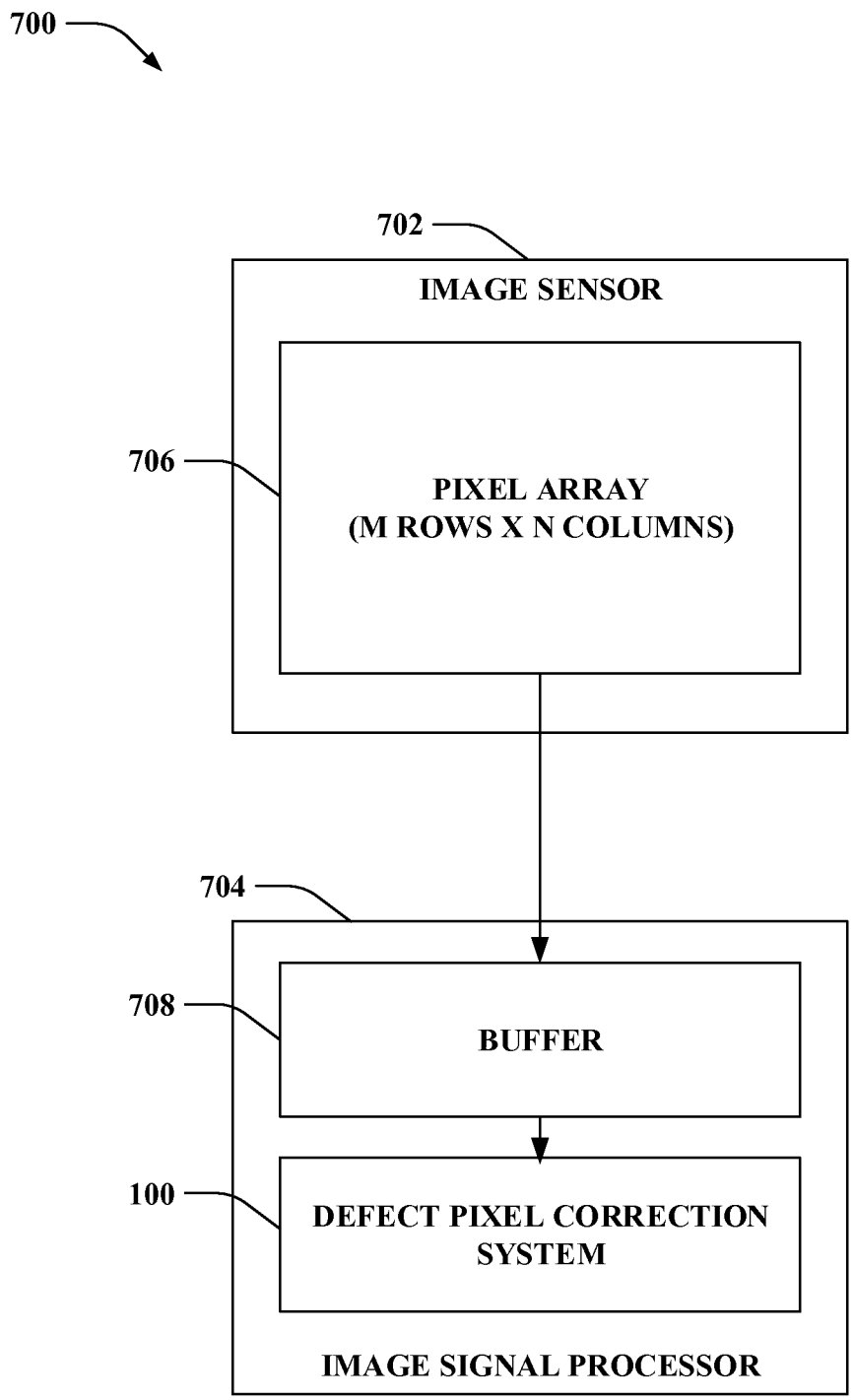
FIG. 7 illustrates an exemplary imaging system that includes an image sensor and an image signal processor.

Now turning to FIG. 7, illustrated is an imaging system 700 that includes an image sensor 702 and an image signal processor 704. The image sensor 702 includes a pixel array 706, which can be substantially similar to the pixel array 602 of FIG. 6. Moreover, the image signal processor 704 includes a buffer 708, which can be substantially similar to the buffer 604 of FIG. 6. Further, the image signal processor 704 includes the defect pixel correction system 100. Thus, pursuant to the example shown in FIG. 7, the defect pixel correction system 100 can be realized in hardware to be implemented as part of the image signal processor 704.

While FIGS. 6-7 illustrate the defect pixel correction system 100 being incorporated as part of an image sensor or an image signal processor, it is contemplated that other off-line image processing pipes can include the defect pixel correction system 100.

Figure 8:
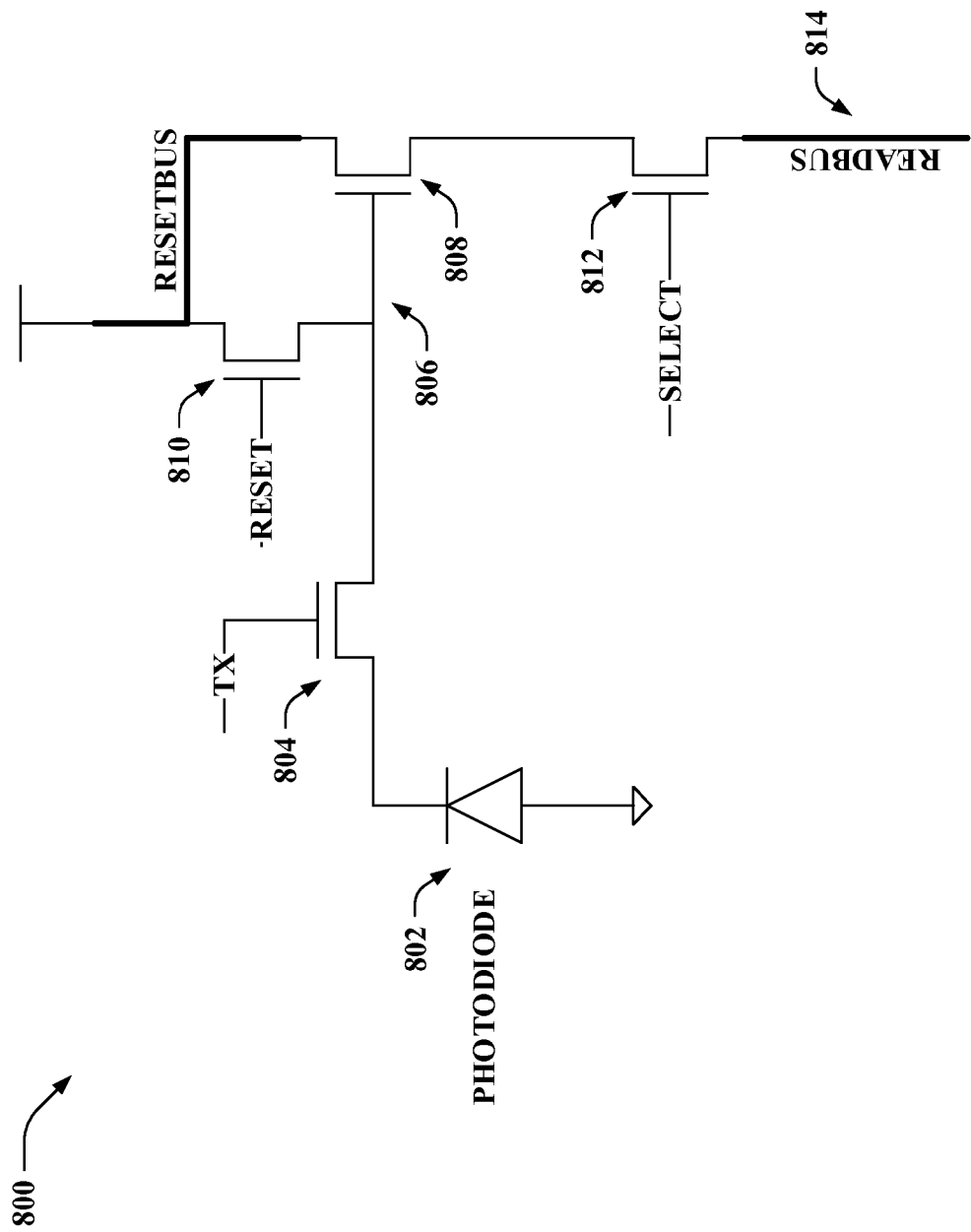
FIG. 8 illustrates a schematic diagram of an exemplary CMOS image sensor pixel that can be included in a pixel array.

Now turning to FIG. 8, illustrated is an exemplary CMOS image sensor pixel cell 800 that can be included in a pixel array (e.g., the pixel array 602 of FIG. 6, the pixel array 706 of FIG. 7). The pixel 800 as depicted is a 4 T pixel cell utilized in a CMOS image sensor system on chip. The pixel 800 includes a photodiode 802 connected to a transfer transistor 804. The transfer transistor 804 is further connected to a floating diffusion region 806. The floating diffusion region 806 connects to a source follower transistor 808 and a reset transistor 810. The source follower transistor 808 is further connected to a select transistor 812. The select transistor 812 can be employed to select a particular row of pixel cells from a pixel array. For instance, a select signal can be received at a gate of the select transistor 812 to read out a value from the floating diffusion region 806.

The photodiode 802 can be charged by converting optical energy to electrical energy. For instance, the photodiode 802 can have sensitivity to a particular type of incident light (e.g., red light, blue light, green light). Yet, it is to be appreciated that the claimed subject matter is not so limited.

According to an illustration, the floating diffusion region 806 can be reset to a known state before transfer of charge to it. Resetting of the floating diffusion region 806 can be effectuated by the reset transistor 810. For example, a reset signal can be received at a gate of the reset transistor 810 to cause resetting of the floating diffusion region 806. Further, the transfer transistor 804 can transfer charge (e.g., provided by the photodiode 802) to the floating diffusion region 806. The charge can be transferred based upon a transfer signal (TX) received at a gate of the transfer transistor 804. Light can be integrated at the photodiode 802 and electrons generated from the light can be transferred to the floating diffusion region 806 (e.g., in a noiseless or substantially noiseless manner) when the TX is received at the transfer transistor 804. Moreover, the pixel 800 (along with other pixel(s) in the same row of the pixel array) can be selected for readout by employing the select transistor 812. Readout can be effectuated via a read bus 814. Further, the source follower transistor 808 can output and/or amplify a signal representing a reset voltage (e.g., provided via a reset bus) and a pixel signal voltage based on the photo converted charges.

It is to be appreciated, however, that different pixel configurations other than the example illustrated in FIG. 8 are intended to fall within the scope of the hereto appended claims. For instance, a disparate pixel configuration can lack the transfer gate transistor 804 (e.g., a 3 T pixel). According to another illustration, a differing pixel configuration can include more than four transistors. Yet, it is to be appreciated that the claimed subject matter is not limited to the aforementioned examples.

Figure 9:
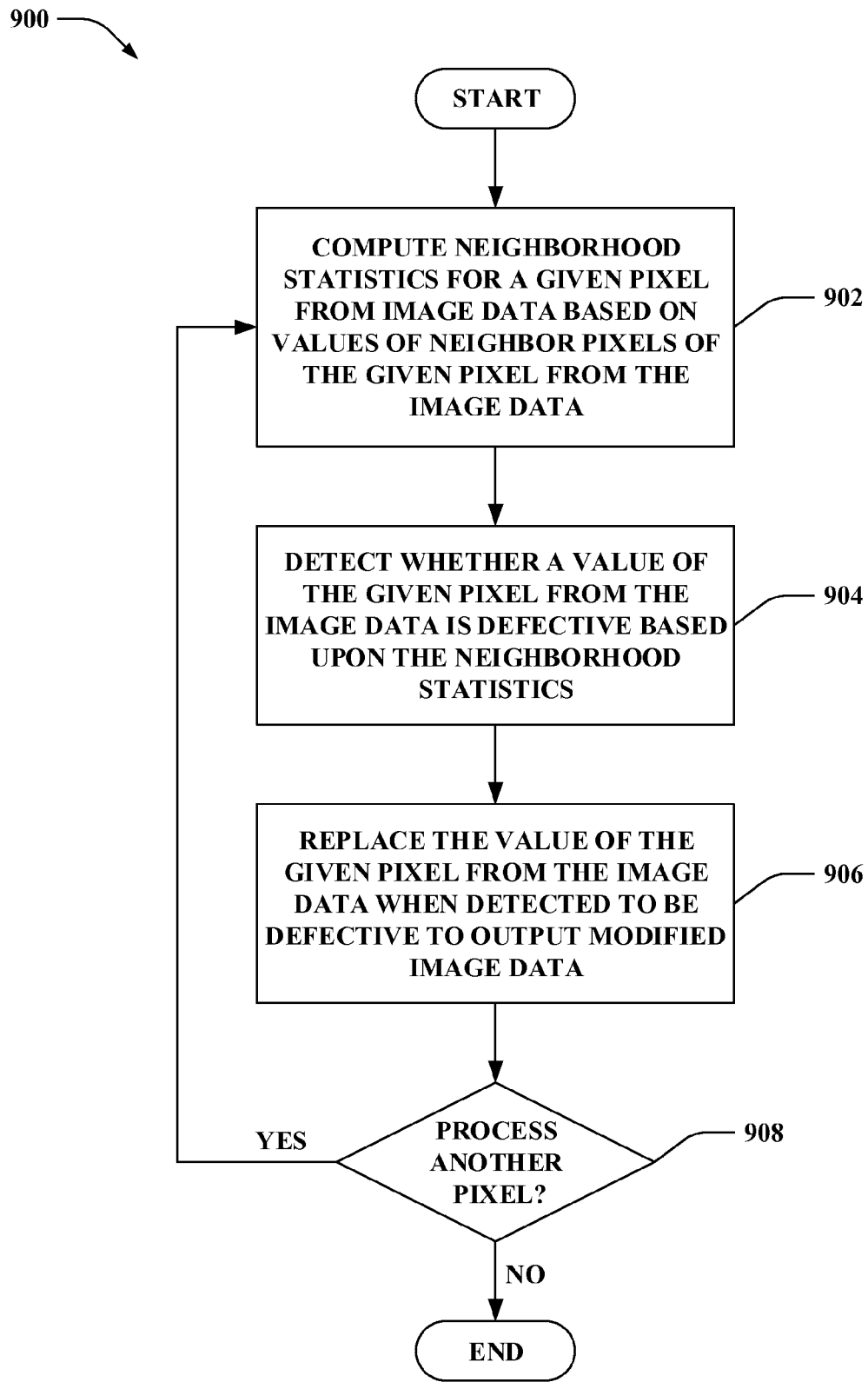
FIG. 9 is a flow diagram that illustrates an exemplary methodology of correcting defect pixels in image data collected by a pixel array of an image sensor.
Figure 10:
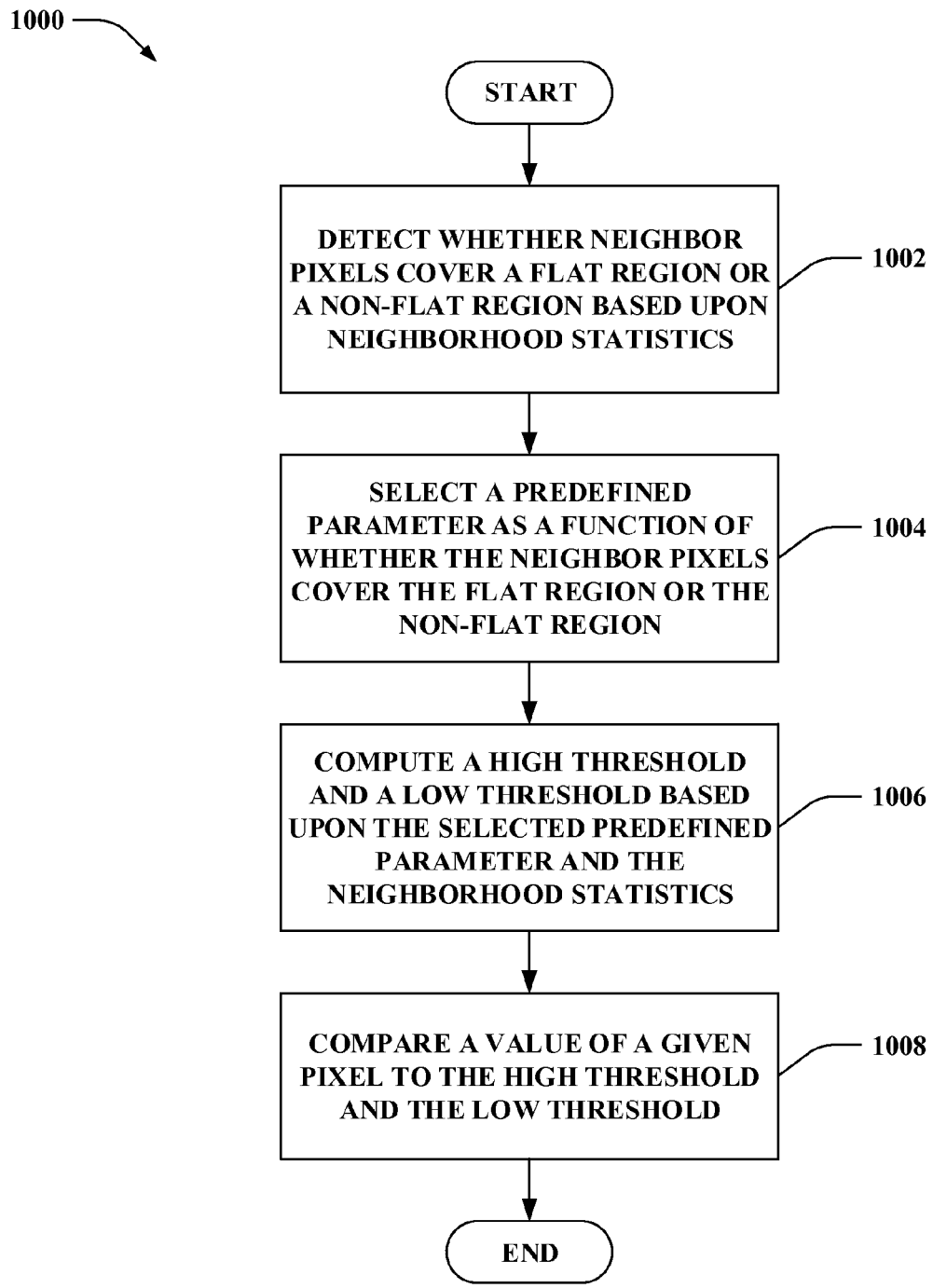
FIG. 10 is a flow diagram that illustrates an exemplary methodology of dynamically detecting whether a value of a given pixel from the image data is defective.
Figure 11:
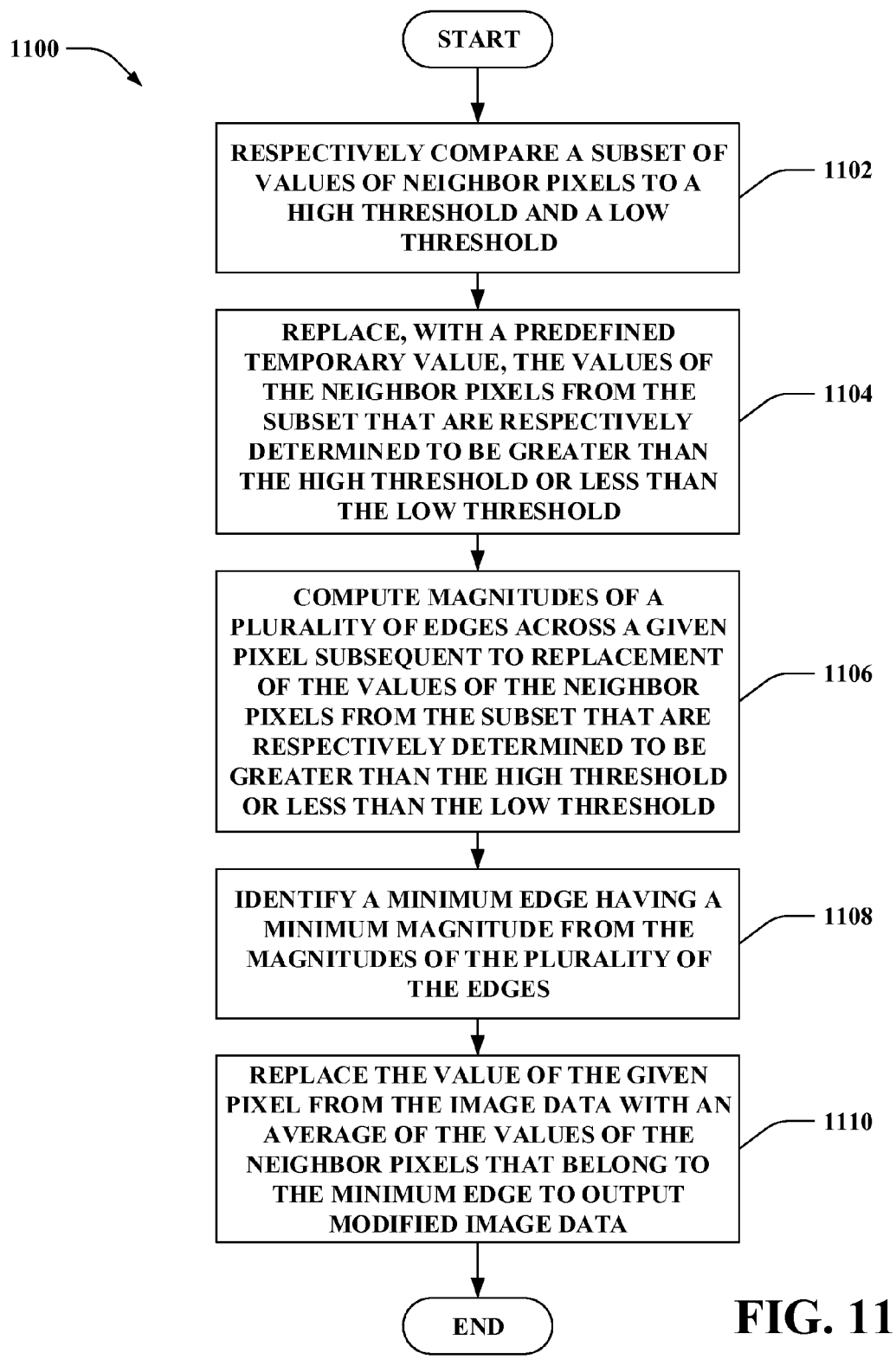
FIG. 11 is a flow diagram that illustrates an exemplary methodology of replacing the value of the given pixel from the image data when detected to be defective to output modified image data when neighbor pixels are detected to cover a non-flat region.

FIGS. 9-11 illustrate exemplary methodologies relating to defect pixel detection and correction. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

The acts described herein may be implemented by an image sensor or an image signal processor. Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

FIG. 9 illustrates a methodology 900 of correcting defect pixels in image data collected by a pixel array of an image sensor. At 902, neighborhood statistics for a given pixel can be computed from the image data based on values of neighbor pixels of the given pixel from the image data. At 904, whether the value of the given pixel from the image data is defective can be detected based upon the neighborhood statistics. At 906, the value of the given pixel from the image data can be replaced when detected to be defective to output modified image data. At 908, it can be determined whether to process another pixel from the pixel array. For example, the pixels of the pixel array can be processed across a first row, then across a second row, etc. through the pixel array. If there is another pixel to be processed, then the methodology 900 can return to 902 to process a next pixel. Alternatively, if the pixels from the pixel array have been processed (e.g., there is not another pixel to be processed), then the methodology 900 can end.

Whether the value of the given pixel from the image data is defective can be determined statically and/or dynamically. For instance, static identification can include checking whether the given pixel is specified as being defective in a static defect pixel map. Dynamic detection is further described below in FIG. 10.

FIG. 10 illustrates a methodology 1000 of dynamically detecting whether the value of the given pixel from the image data is defective. At 1002, whether the neighbor pixels cover a flat region or a non-flat region can be detected based upon the neighborhood statistics. At 1004, a predefined parameter can be selected as a function of whether the neighbor pixels cover the flat region or the non-flat region. At 1006, a high threshold and a low threshold can be computed based upon the selected predefined parameter and the neighborhood statistics. At 1008, the value of a given pixel can be compared to the high threshold and the low threshold.

According to an example, when the neighbor pixels are detected to cover the flat region and the value of the given pixel from the image data is determined to be greater than the high threshold or less than the low threshold, then the value of the given pixel from the image data can be replaced with a central tendency measure of the values of the neighbor pixels to output modified image data. Alternatively, when the neighbor pixels are detected to cover the non-flat region and the value of the given pixel from the image data is determined to be greater than the high threshold or less than the low threshold, then replacement of the value of the given pixel can be effectuated as described below in FIG. 11. Replacement of the value of the given pixel can also be effectuated as described below in FIG. 11 when the given pixel is specified as being defective in a static defect pixel map.

With reference to FIG. 11, illustrated is a methodology 1100 of replacing the value of the given pixel from the image data when detected to be defective to output the modified image data when the neighbor pixels are detected to cover the non-flat region. At 1102, a subset of values of the neighbor pixels can be respectively compared to the high threshold and the low threshold (e.g., computed at 1006 in FIG. 10). At 1104, the values of the neighbor pixels from the subset that are respectively determined to be greater than the high threshold or less than the low threshold can be replaced with a predefined temporary value. At 1106, magnitudes of a plurality of edges across the given pixel can be computed subsequent to replacement of the values of the neighbor pixels from the subset that are respectively determined to be greater than the high threshold or less than the low threshold. At 1108, a minimum edge having a minimum magnitude from the magnitudes of the plurality of the edges can be identified. At 1110, the value of the given pixel from the image data can be replaced with an average of the values of the neighbor pixels that belong to the minimum edge to output the modified image data.

Figure 12:
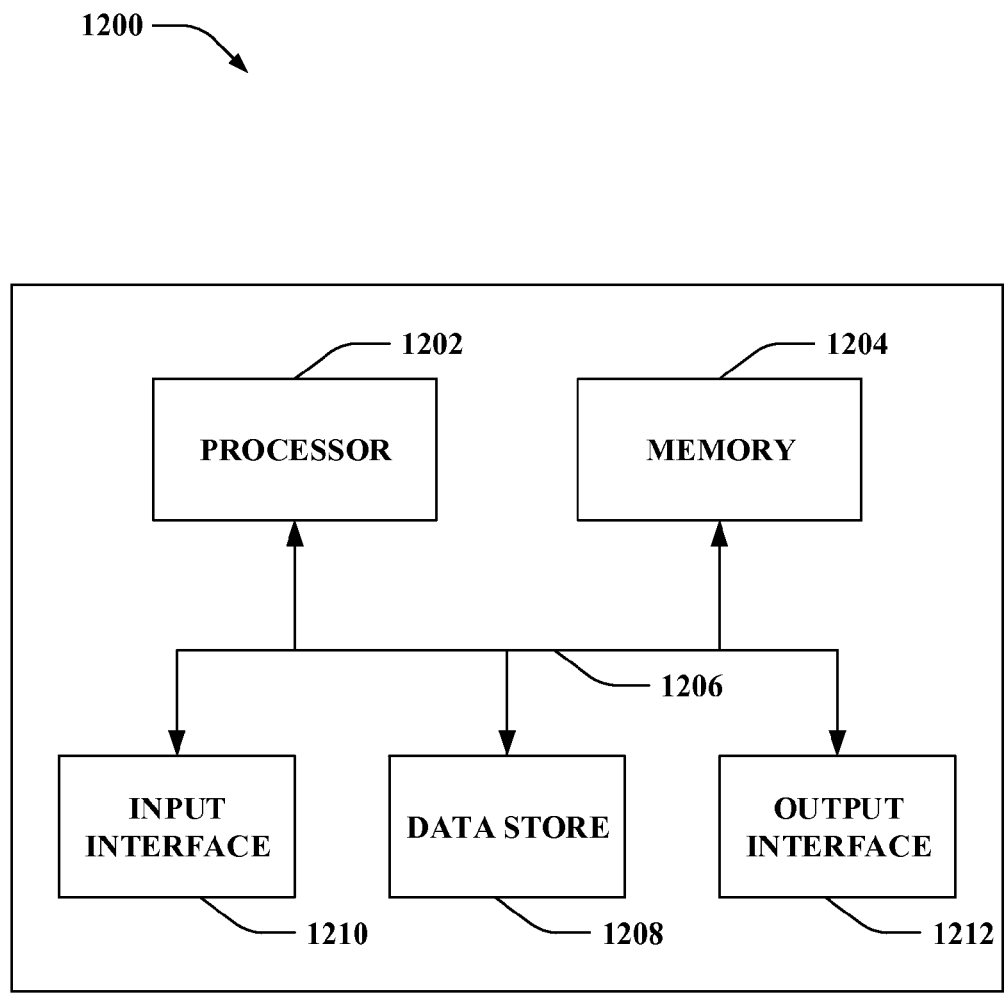
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may employ a CMOS image sensor system on chip. According to another, one or more components of the computing device 1200 can be integrated in a CMOS image sensor system on chip. The computing device 1200 includes at least one processor 1202 that executes instructions that are stored in a memory 1204. The processor 1202 may access the memory 1204 by way of a system bus 1206.

The computing device 1200 additionally includes a data store 1208 that is accessible by the processor 1202 by way of the system bus 1206. The data store 1208 may include executable instructions, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A defect pixel correction system for image data collected by a pixel array of an image sensor, comprising:
   a defect detection component that detects whether a value of a given pixel from the image data is defective based upon neighborhood statistics for the given pixel, the defect detection component compares the value of the given pixel to a high threshold and a low threshold for the given pixel to detect whether the value of the given pixel is defective, the high threshold and the low threshold being a function of a predefined parameter and the neighborhood statistics, the neighborhood statistics being based on values of neighbor pixels of the given pixel from the image data, the neighbor pixels and the given pixel belong to a particular Bayer domain; and a replacement component that replaces the value of the given pixel from the image data responsive to being detected to be defective.

2. The defect pixel correction system of claim 1, further comprising a neighborhood analysis component that computes the neighborhood statistics for the given pixel from the image data.

3. The defect pixel correction system of claim 1, each of the neighbor pixels of the given pixel are one of vertically, horizontally, or diagonally adjacent to the given pixel within the particular Bayer domain.

4. The defect pixel correction system of claim 1, the neighborhood statistics comprise a standard deviation of the values of the neighbor pixels and a central tendency measure of the values of the neighbor pixels, and the central tendency measure of the values of the neighbor pixels is at least one of a mean of the values of the neighbor pixels or a median of the values of the neighbor pixels.

5. The defect pixel correction system of claim 1, the predefined parameter being a function of whether the neighbor pixels cover a flat region or a non-flat region as detected based upon the neighborhood statistics.

6. The defect pixel correction system of claim 1, the high threshold and the low threshold being more sensitive to a hot pixel as compared to a cold pixel.

7. The defect pixel correction system of claim 1, the defect detection component further comprising a static identification component that checks whether the given pixel is specified as being defective in a static defect pixel map.

8. The defect pixel correction system of claim 1, the replacement component further comprises a flat replacement component that replaces the value of the given pixel from the image data with a central tendency measure of the values of the neighbor pixels responsive to the neighbor pixels being detected to cover a flat region and the given pixel being detected to be defective.

9. The defect pixel correction system of claim 1, the replacement component further comprising:
a neighbor comparison component that respectively determines whether a subset of the values of the neighbor pixels are defective based on a high threshold and a low threshold for the given pixel, the subset of the values of the neighbor pixels have yet to be processed, the neighbor comparison component determines whether the subset of the values of the neighbor pixels are defective responsive to the neighbor pixels being detected to cover a non-flat region and the given pixel being detected to be defective;
a neighbor replacement component that replaces the values of the neighbor pixels from the subset that are respectively determined to be defective with a predefined temporary value; and
a value exchange component that replaces the value of the given pixel from the image data with a value based on the values of the neighbor pixels subsequent to replacement of the values of the neighbor pixels from the subset that are respectively determined to be defective.

10. The defect pixel correction system of claim 9, the replacement component further comprising:
an edge computation component that computes magnitudes of a plurality of edges across the given pixel subsequent to the replacement of the values of the neighbor pixels from the subset that are respectively determined to be defective;
a minimum detection component that identifies a minimum edge having a minimum magnitude from the magnitudes of the plurality of edges; and
the value exchange component replaces the value of the given pixel from the image data with an average of the values of the neighbor pixels that belong to the minimum edge.

11. The defect pixel correction system of claim 1 comprised in the image sensor.

12. The defect pixel correction system of claim 1 comprised in an image signal processor.

13. An image sensor, comprising:
a pixel array;
a buffer that retains image data collected by the pixel array; and
a defect pixel correction system, comprising:
a defect detection component that detects whether a value of a given pixel from the image data is defective based upon neighborhood statistics for the given pixel, the defect detection component compares the value of the given pixel to a high threshold and a low threshold for the given pixel to detect whether the value of the given pixel is defective, the high threshold and the low threshold being a function of a predefined parameter and the neighborhood statistics, the neighborhood statistics being based on values of neighbor pixels of the given pixel from the image data, the neighbor pixels and the given pixel belong to a particular Bayer domain; and
a replacement component that replaces the value of the given pixel from the image data responsive to being detected to be defective.

14. The image sensor of claim 13, the predefined parameter being a function of whether the neighbor pixels cover a flat region or a non-flat region as detected based upon the neighborhood statistics.

15. The image sensor of claim 13, the replacement component further comprising:
a neighbor comparison component that respectively determines whether a subset of the values of the neighbor pixels are defective based on a high threshold and a low threshold for the given pixel, the subset of the values of the neighbor pixels have yet to be processed, the neighbor comparison component determines whether the subset of the values of the neighbor pixels are defective responsive to the neighbor pixels being detected to cover a non-flat region and the given pixel being detected to be defective;
a neighbor replacement component that replaces the values of the neighbor pixels from the subset that are respectively determined to be defective with a predefined temporary value; and
a value exchange component that replaces the value of the given pixel from the image data with a value based on the values of the neighbor pixels subsequent to replacement of the values of the neighbor pixels from the subset that are respectively determined to be defective.

16. The image sensor of claim 15, the replacement component further comprising:

an edge computation component that computes magnitudes of a plurality of edges across the given pixel subsequent to the replacement of the values of the neighbor pixels from the subset that are respectively determined to be defective;

a minimum detection component that identifies a minimum edge having a minimum magnitude from the magnitudes of the plurality of edges; and the value exchange component replaces the value of the given pixel from the image data with an average of the values of the neighbor pixels that belong to the minimum edge.

17. An image signal processor, comprising:

a buffer that retains image data collected by a pixel array; and a defect pixel correction system, comprising:

a defect detection component that detects whether a value of a given pixel from the image data is defective based upon neighborhood statistics for the given pixel, the defect detection component compares the value of the given pixel to a high threshold and a low threshold for the given pixel to detect whether the value of the given pixel is defective, the high threshold and the low threshold being a function of a predefined parameter and the neighborhood statistics, the neighborhood statistics being based on values of neighbor pixels of the given pixel from the image data, the neighbor pixels and the given pixel belong to a particular Bayer domain; and a replacement component that replaces the value of the given pixel from the image data responsive to being detected to be defective.

18. The image signal processor of claim 17, the predefined parameter being a function of whether the neighbor pixels cover a flat region or a non-flat region as detected based upon the neighborhood statistics.

19. The image signal processor of claim 17, the replacement component further comprising:

a neighbor comparison component that respectively determines whether a subset of the values of the neighbor pixels are defective based on a high threshold and a low threshold for the given pixel, the subset of the values of the neighbor pixels have yet to be processed, the neighbor comparison component determines whether the subset of the values of the neighbor pixels are defective responsive to the neighbor pixels being detected to cover a non-flat region and the given pixel being detected to be defective;

a neighbor replacement component that replaces the values of the neighbor pixels from the subset that are respectively determined to be defective with a predefined temporary value; an edge computation component that computes magnitudes of a plurality of edges across the given pixel subsequent to replacement of the values of the neighbor pixels from the subset that are respectively determined to be defective;

a minimum detection component that identifies a minimum edge having a minimum magnitude from the magnitudes of the plurality of edges; and a value exchange component that replaces the value of the given pixel from the image data with an average of the values of the neighbor pixels that belong to the minimum edge.

20. The image sensor of claim 13, the high threshold and the low threshold being more sensitive to a hot pixel as compared to a cold pixel.

* * * * *